Sept. 21, 1948.  B. B. LE MAY, JR  2,449,608
TRANSMISSION AND CONTROL THEREFOR
Filed March 8, 1943  3 Sheets—Sheet 1

Inventor:
B. Byron LeMay, Jr.
By: Edward C. Fitzhugh
Atty.

Sept. 21, 1948.   B. B. LE MAY, JR   2,449,608
TRANSMISSION AND CONTROL THEREFOR
Filed March 8, 1943   3 Sheets-Sheet 2
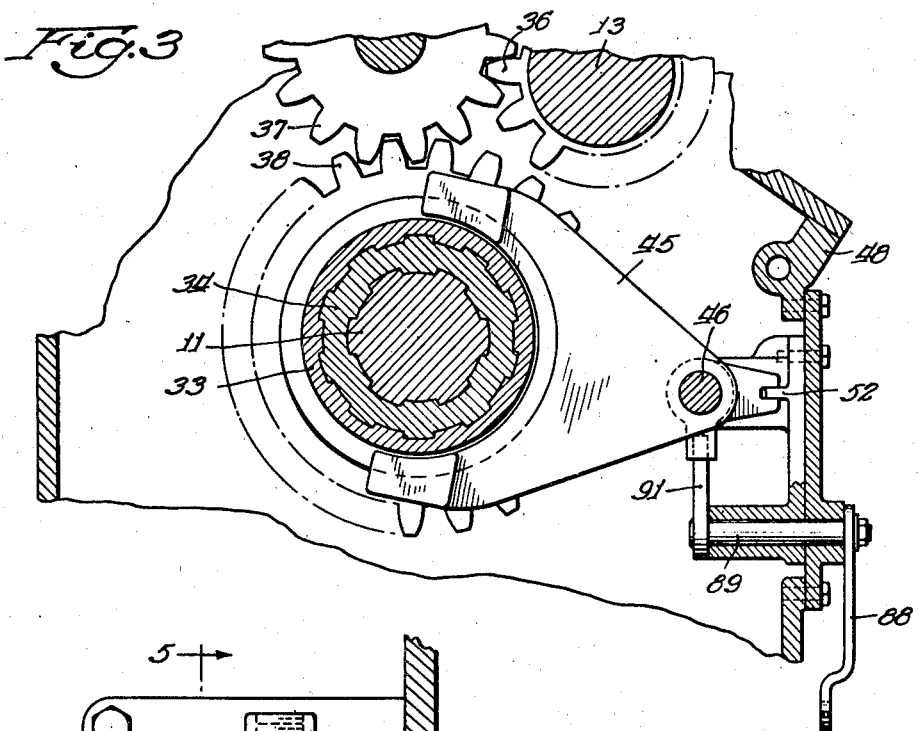
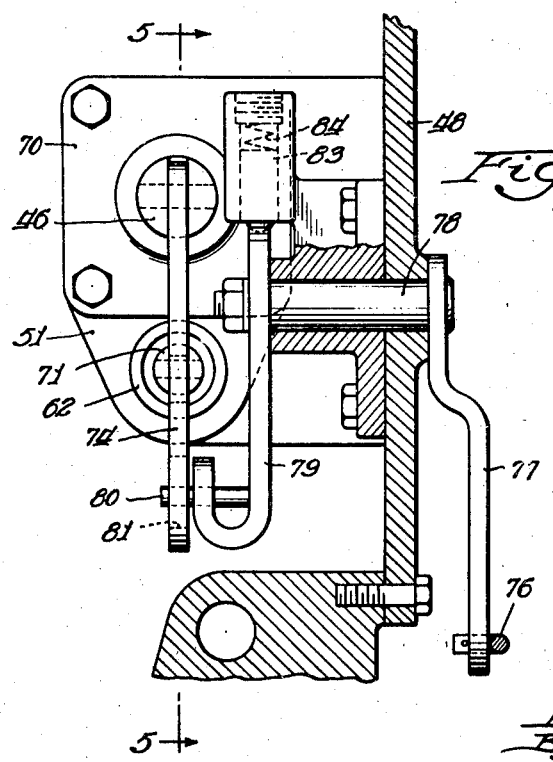
Inventor:
B. Byron LeMay, Jr.
By: Edward C. Fitzhugh
Atty.

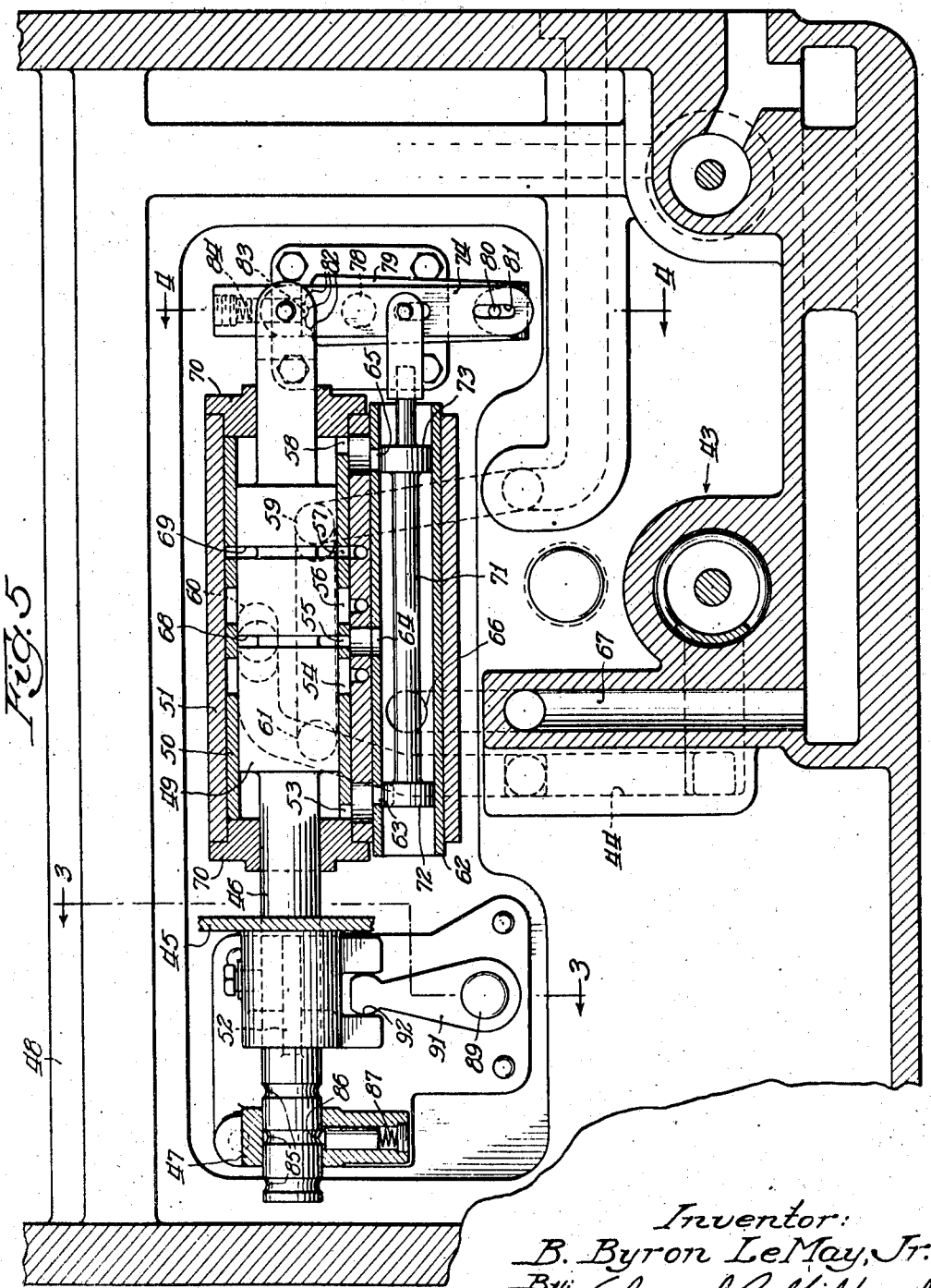

Patented Sept. 21, 1948

2,449,608

UNITED STATES PATENT OFFICE 2,449,608

TRANSMISSION AND CONTROL THEREFOR

Braudice Byron Le May, Jr., Muncie, Ind., assignor to Borg-Warner Corporation, Chicago, Ill., a corporation of Illinois Application March 8, 1943, Serial No. 478,365

21 Claims. (Cl. 192—3.2)

My invention relates to transmissions, and more particularly to transmissions suitable for use in propelling heavy vehicles such as military tanks, rail cars, tractors and trucks.

It has been proposed to provide a transmission comprising input and output shafts, a hydrodynamic coupling device, a friction-type clutch for connecting the input shaft and hydrodynamic device, a gear train adapted to be driven by the hydrodynamic device, a positive-type clutch for connecting a gear of the gear train with the output shaft for completing a power train between the hydrodynamic device and the output shaft and a brake for the driven element of the coupling device for facilitating engagement of the positive-type clutch. Such a transmission is disclosed in the copending application of Harold E. Carnagua Serial No. 486,293, filed May 10, 1943.

It is an object of my invention to provide improved control means for simultaneously engaging the two clutches in a transmission of the above type. It is also an object of my invention to provide improved means for engaging the positive-type clutch and disengaging the brake for the driven element of the hydrodynamic device with the same operative stroke.

It is contemplated that the brake for the driven element of the hydrodynamic device and the friction clutch shall preferably be power-operated, and it is a further object to provide a control mechanically connected with the positive-type clutch for actuating the clutch and including a power control which so controls the power supplied to the brake and friction clutch that when the positive-type clutch is engaged, the friction clutch is also engaged and the brake is disengaged. It is contemplated that the brake and friction clutch shall preferably be fluid pressure operated and that the control for the positive-type clutch shall include a valve connected with a source of fluid pressure such as a pump and also connected with the brake and friction clutch.

It is another object of my invention to provide power means whereby the control mechanically connected with the positive-type clutch is moved by fluid pressure, with the construction being such that the movable part of the positive clutch is moved distances corresponding with the distances a control lever for the power means is moved.

My invention consists of the novel constructions, arrangements and devices to be hereinafter described and claimed for carrying out the above-stated objects and such other objects as will appear from the following description of a certain preferred embodiment illustrated in the accompanying drawings wherein:

Fig. 3 is a sectional view taken on lines 3—3 of Figs. 2 and 5;

Fig. 4 is a sectional view taken on lines 4—4 of Figs. 2 and 5; and

Fig. 5 is a sectional view taken on line 5—5 of Fig. 4.

Like characters of reference designate like parts in the several views.

Figure 1:
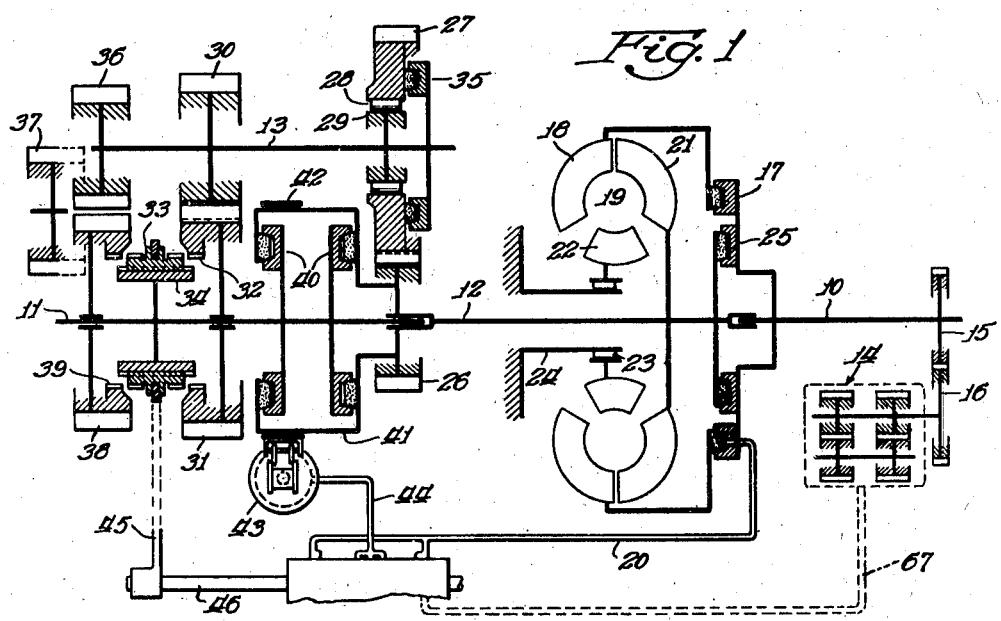
Fig. 1 is a diagrammatic illustration of a transmission and control mechanism therefor embodying the principles of my invention.

The illustrated transmission comprises an input shaft 10, an output shaft 11, an intermediate shaft 12 and a countershaft 13. The input shaft 10 is adapted to drive a pump 14 of any suitable construction by means of gears 15 and 16, and the shaft is connected with a friction clutch 17 which when engaged functions to connect the shaft 10 and the driving element 18 of a hydrodynamic coupling device 19. The clutch 17 may be of any suitable construction so as to be engaged by fluid under pressure which may be applied through a fluid line 20 suitably connected with the clutch. The hydrodynamic device 19 is preferably of the torque converter type and comprises, in addition to the driving element 18, a driven element 21 and a stator element 22. The driven element 21 is connected with the intermediate shaft 12, and the stator element 22 is connected through a one-way brake 23 with a stationary shaft 24. The one-way brake 23 functions to allow the stator element 22 to rotate freely in a forward direction, but the brake prevents rotation of the stator element in a reverse direction. The coupling device 19 is of well-known construction and functions to drive the element 21 and thereby the shaft 12 at a lower speed but with greater torque than the driving element 18 and shaft 10 are driven. A clutch 25 of any suitable construction is preferably provided for connecting directly the shafts 10 and 12 and locking up the torque converter 19 when the clutch 17 is engaged.

The shaft 12 has fixed thereon a gear 26 which is in mesh with a gear 27 mounted on the shaft 13 by means of a one-way clutch 28 and a hub member 29. The shaft 13 has fixed thereon a gear 30 which is in mesh with a gear 31 rotatively disposed on the output shaft 11. The gear 31 is provided with clutch teeth 32 with which a set of teeth on a clutch member 33, which is slidably and non-rotatably disposed on a hub member 34 fixed to shaft 11, are adapted to mesh. The teeth 32 and the clutch member 33 form a positive type clutch for connecting the gear 31 and shaft 11 as is apparent. The one-way clutch 28 is of such construction that there is a complete power train between the shafts 12 and 11 with teeth on the clutch member 33 being interengaged with the teeth 32 whereby the shaft 11 is driven in the forward direction when the shaft 12 is driven in such direction. A clutch 35 of any suitable construction is preferably provided for locking up the one-way clutch 28.

A gear 36 is fixed on the shaft 13, and the gear is in mesh with an idler gear 37 which in turn is in mesh with a gear 38 rotatably disposed on the output shaft 11. The gear 38 is provided with clutch teeth 39 which are adapted to interengage with teeth provided on the clutch member 33, and the teeth 39 and the teeth on the clutch member 33 form a positive type clutch for connecting the gear 38 and the shaft 11 as is apparent.

A clutch 40 actuated by any suitable means is provided for connecting directly the shafts 12 and 11. The clutch 40 comprises a drum-like portion 41 rotatable with the shaft 12, and a brake 42 is provided for acting on the portion 41. The brake 42 is adapted to be brought into engagement on the portion 41 by means of an operator 43 which is actuated by fluid pressure applied to the operator through a conduit 44.

The illustrated transmission may be controlled to provide three speeds in forward drive and one speed in reverse drive. Low speed forward drive is obtained when the positive clutch comprising the clutch member 33 and teeth 32 is engaged and the clutch 17 is engaged. The brake 42 is preferably utilized for stopping rotation of the gear 31 prior to engagement of the member 33 with teeth 32 to prevent clashing of teeth. The drive is then from shaft 10, through clutch 17, hydrodynamic device 19, shaft 12, gears 26 and 27, one-way clutch 28, hub member 29, shaft 13, gears 30 and 31, teeth 32, clutch member 33 and hub 34 to shaft 11. Intermediate speed in forward drive may be obtained by thereafter engaging clutch 40 with the clutch 35 disengaged, and the drive is then from shaft 10, through clutch 17, torque converter 19, shaft 12, and clutch 40 to shaft 11. In this speed, the clutch 28 overruns as is apparent. High speed in forward drive may thereafter be obtained by engaging clutch 25 to lock up the torque converter 19, and the drive is then from shaft 10, through clutch 25, shaft 12 and clutch 40, to shaft 11. A drive in reverse may be obtained by engaging teeth on the clutch member 33 with the teeth 39 and engaging the clutch 17 with clutches 25 and 40 disengaged. The brake 42 is preferably utilized for stopping rotation of gear 38 prior to engagement of member 33 with teeth 39 for preventing clashing of the teeth. The drive is then from shaft 10, through clutch 17, torque converter 19, shaft 12, gears 26 and 27, one-way clutch 28, hub member 29, shaft 13, gears 36, 37 and 38, teeth 39, clutch member 33, and hub 34, to shaft 11.

My improved transmission control mechanism is provided for controlling the clutch 17, the brake 42, and the clutch member 33, and reference may be made to Figs. 2 to 5 for illustration of the mechanism. A yoke member 45 fitting in a suitable groove formed in the clutch member 33 is provided for moving the clutch member. The yoke member 45 is fixed on a shaft 46 which is slidably disposed in a bearing 47 fixed with respect to the housing 48 for the transmission. The shaft 46 is provided with a piston portion 49 slidably disposed in a sleeve 50 which is fixed in a cylindrical cavity formed in a valve block 51 suitably fixed with respect to the housing 48. It will thus be apparent that the shaft 46 and yoke member 45 are supported by the valve block 51 in addition to the bearing 47, and still additional support for the yoke member 45 is provided by a rib 52 fixed with respect to the housing 48 and fitting in a groove formed in the yoke member. The yoke member 45 and clutch member 33 are movable with the shaft 46, and the yoke member and clutch member may be moved to engage teeth on the clutch member with either the teeth 39 or 32 by movement of the shaft 46.

The sleeve 50 is provided with openings 53, 54, 55, 56, 57, 58, 59, 60 and 61. The opening 60 is elongated as shown and is connected with the conduit 44 for the brake operator 43. The openings 59 and 61 are connected with the conduit 20 for the clutch 17, and the opening 59 is elongated as shown. The openings 54, 56 and 57 are connected with any suitable conduits whereby fluid may freely drain through the openings as to a suitable sump (not shown). The valve block 51 is provided with another cylindrical cavity in which is disposed a sleeve 62 having openings 63, 64, 65 and 66 formed therein. The openings 63, 64 and 65 are in communication, by means of suitable passages in the valve block 51, with the openings 53, 55 and 58 respectively in the sleeve 50, and the opening 66 is in communication with a conduit 67 which is connected with the pump 14 and which thus carries a supply of fluid under pressure.

The valve piston 49 is provided with slots 68 and 69, and the sleeve 50 is closed at its ends by caps 70 which are provided with suitable openings through which the shaft 46 projects. A valve piston 71 which may be termed a follow-up valve and having lands 72 and 73 is slidably disposed in the sleeve 62, and the pistons 49 and 71 are interconnected by a link 74 which is pivotally connected with the shaft 46 and has a pin and slot connection with the piston 71.

The link 74 and the valve pistons 49 and 71 are adapted to be controlled by a control rod 75 which is disposed at the side of the transmission and is swingably mounted with respect to the transmission. The rod 75 is connected by a link 76 with a lever 77 which is fixed to a shaft 78 rotatably disposed in the transmission housing 48. The shaft 78 has fixed on its inner end a lever 79 which carries a pin 80 on the lower end of the lever. The link 74 is provided with a slot 81 in its lower end, and the pin 80 projects into the slot as shown.

The rod 75, the link 74, the valve pistons 49 and 71, and the yoke member 45 are shown in their neutral positions in the drawings. In the neutral position of the piston 71, the lands 72 and 73 block the openings 63 and 65 respectively in the sleeve 62, and fluid under pressure from the conduit 67 thus cannot flow through the latter openings. In the neutral position of the valve piston 49, the slot 68 is in communication with the openings 55 and 60, and fluid under pressure flows from opening 66 through the sleeve 62, the openings 64 and 55, the slot 68 and the opening 60 to the conduit 44. Fluid under pressure is thereby applied to the brake operator 43, and the brake 42 is engaged to stop rotation of the shaft 12 and driven element 21. Rotation of the gears 38 and 31 also is thereby stopped, and the clutch member 33 may be easily engaged with either the clutch teeth 39 or 32. In the neutral position of the valve piston 49, the slot 69 is in communication with the openings 59 and 57, and any fluid in the conduit 20 is drained through the opening 59, the slot 69, and the opening 57 which is connected with suitable drainage passages in the valve block 51. The clutch 17 is thereby maintained disengaged.

Figure 2:
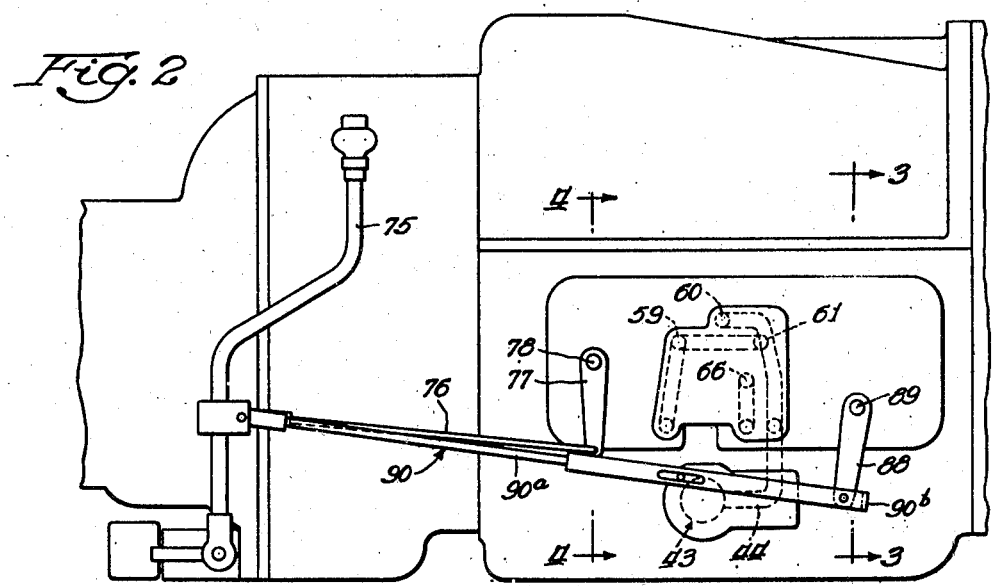
Fig. 2 is a side view of the transmission.

When the control rod 75 is moved in a clockwise direction as seen in Fig. 2, the lever 77 is rotated in a counterclockwise direction as seen in that figure, and the lever 79 is rotated in a clockwise direction as seen in Fig. 5 and rotates the link 74 in a clockwise direction about the pivotal connection of the link with the piston rod 46. Such movement of the link 74 moves the valve piston 71 to the left as seen in Fig. 5, and the piston thereby connects the sleeve openings 66 and 63, and fluid under pressure flows from opening 66 through the openings 63 and 53 to the left end of the valve piston 49 between the piston and the cap 70 adjacent that end of the piston. Such application of fluid under pressure to the piston 49 functions to move the piston to the right as seen in Fig. 5, and the yoke member 45 and clutch member 33 are moved in a direction to engage teeth on the clutch member with the teeth 32 on the gear 31. Such movement of the valve piston 49 to the right also functions to rotate the lever 74 in a clockwise direction about the pin 80 and to move the valve piston 71 back to its neutral position to stop fluid flow through the sleeve opening 63, assuming that the rod 75 and link 74 have been moved only through predetermined distances short of a position corresponding to full engagement of clutch member 33 with clutch teeth 32. It will thus be apparent that a movement of the control rod 75 and thereby of the lower end of the link 74 functions to cause a corresponding movement of the valve piston 49, yoke member 45 and clutch member 33, such movement of the piston and members 45 and 33 being under the action of fluid pressure. It will further be apparent that teeth on the clutch member 33 may be engaged as slowly as desired with the teeth 32 simply by correspondingly slow movement of the control rod 75.

When teeth on the clutch member 33 have been fully engaged with the teeth 32, whereby the transmission is conditioned for low speed in forward drive, the control rod 75 is in a position rotated clockwise from its position shown in Fig. 2, and the lever 79 and link 74 are in positions rotated clockwise from their positions as shown in Fig. 5. In this condition of the control mechanism, the valve piston 49 is moved to the right as seen in Fig. 5 with its right end adjacent the cap 70 at the right end of the sleeve 50, and the valve piston 71 is moved to the left as seen in the figure to open the sleeve opening 63. In this position of the piston 49, the slot 69 is out of communication with the sleeve opening 57, and fluid in the conduit 20 cannot thereby drain from the conduit. The left end of the piston 49 is moved to open the opening 61, and the sleeve opening 66 in sleeve 62 is connected with the opening 61 by means of openings 63 and 53, and fluid under pressure is thereby supplied to the conduit 20 and to the clutch 17 for engaging the clutch. The slot 68, in this position of the piston 49, is in communication with the opening 56, and fluid from the conduit 44 is drained therefrom through opening 60, slot 68 and opening 56 to disengage the brake 42. It will thus be apparent that by movement of the rod 75 in a clockwise direction as seen in Fig. 2, the positive-type clutch comprising the clutch member 33 and teeth 32 are engaged by the fluid under pressure from the pump 14 acting on the valve piston 49, and the valve piston is moved so as to connect the pump 14 and the clutch 17 for engaging the clutch and to disconnect the brake operator 43 and pump 14 for disengaging the brake.

The clutch member 33 and yoke 45 are returned to their neutral positions by movement of the control rod 75 and thereby the link 74 to the neutral positions of the rod and link. When the link 74 is moved from a position rotated clockwise with respect to its position as shown in Fig. 5 and corresponding to the position causing full interengagement of teeth on the clutch member 33 and the teeth 32, back toward its neutral position, the piston 71 is moved to the right as seen in the figure to connect the sleeve openings 66 and 65 whereby fluid under pressure is supplied to the sleeve 50 between the right end of the piston 49 and the adjacent cap 70. Such movement of the piston 71 also opens the opening 63 as is apparent. The fluid under pressure applied to the valve piston 49 functions to move the piston to the left as seen in the figure, and, on such movement of the piston, fluid between the left end of the piston and the adjacent cap 70 is drained through the openings 53 and 63. The link 74, the pistons 49 and 71 and the clutch member 33 are thus returned to their neutral positions, as shown in the drawing, and the piston 49 again acts to drain the conduit 20 through the opening 59, slot 69 and opening 57 to disengage the clutch 17 and to connect the conduit 44 by means of the opening 60, slot 68 and openings 55, 64 and 66 with the conduit 67 carrying fluid under pressure for engaging the brake 42.

When the control rod 75 is moved from its neutral position in a counterclockwise direction as seen in Fig. 2, the lever 74, valve pistons 49 and 71 and the clutch member 33 are moved similarly to but in opposite directions from their movements in the case when the control rod 75 is moved in a clockwise direction from its neutral position. Teeth on the clutch member 33 are thereby engaged with the teeth 39 on the gear 38 to connect the gear 38 and output shaft 11, and the clutch 17 is engaged and the brake 42 is disengaged as is apparent.

Poppet means are preferably provided for both the member 79 and the shaft 46 for yieldingly holding the member and shaft in their positions corresponding to forward, reverse or neutral conditions of the transmission. The poppet means for the member 79 comprises notches 82 formed in the member 79, a plunger 83 slidably disposed in a cylindrical cavity formed in a portion fixed with respect to the housing 48, and a spring 84 for yieldingly pressing the plunger into the notches 82. The notches 82 are so disposed in the member 79 that when the member is in position such that the plunger 83 is in the center notch, the notch on the left or the notch on the right as seen in Fig. 5, the member 79 is in its position corresponding to neutral, forward, or reverse condition respectively, of the transmission. The poppet means for the shaft 46 comprises notches 85 in the shaft, a plunger 86 slidably disposed in a cylindrical cavity in a portion fixed with respect to the housing 48, and a spring 87 for yieldingly maintaining the plunger in any of the notches 85. The notches 85 are so disposed in the shaft 46 that when the shaft is positioned such that the plunger 86 is in the center notch, the notch on the left or the notch on the right as seen in Fig. 5, the clutch member 33 is respectively in its neutral position with the teeth thereon disengaged from the teeth 39 and 32 or in forward drive position with the teeth on the clutch member engaged with the teeth 32 or in reverse drive position with the teeth thereon engaged with the teeth 39.

Means is provided for manually moving the clutch member 33 when it is not possible to do so by means of fluid pressure acting on the valve piston 49, as for example, when the engine of the vehicle is stalled. This operating means for the clutch member 33 includes a lever 88 fixed on a shaft 89 extending through the transmission housing 48, and a link 90 connecting the control rod 75 and lever 88. The link 90 preferably comprises two link portions 90a and 90b between which there is a lost motion connection, such as a connection of the pin and slot type. A lever 91 is fixed on the inner end of the shaft 89, and the yoke member 45 is provided with a slot 92 in which an end of the lever 91 is disposed. Assuming that fluid pressure is not present in conduit 67, when the control rod 75 is moved in a clockwise direction as seen in Fig. 2, the lever 88 is moved in a counterclockwise direction by means of the link 90, and the lever 91 is moved in a clockwise direction as seen in Fig. 5 and moves the yoke member 45 and the clutch member 33 to engage teeth on the clutch member with the teeth 32. The transmission is thereby conditioned for low speed forward drive by manual operation of the clutch member 33. The clutch member 33 may be manually moved back to neutral position by movement of the control rod 75 in a counterclockwise direction, and the clutch member 33 may be moved from its neutral position to engage teeth thereon with the teeth 39 for conditioning the transmission for reverse drive by continuing such counterclockwise movement of the control rod. The member 33 may be returned to neutral position by manual operation by thereafter moving the control rod 75 in a clockwise direction as seen in Fig. 2. The lost motion connection between the link portions 90a and 90b is provided in order that the link 90 and lever 88 are ordinarily not operative to move the clutch member 33 when there is fluid under pressure in the conduit 67 and the clutch member 33 may thus be engaged by fluid pressure acting on the valve piston 49. The manual control means for the clutch member 33 and including the levers 88 and 91 and the link 90 is particularly useful for shifting the clutch member 33 when there is no fluid pressure in the conduit 67, as when the vehicle engine is stalled, and the teeth on the clutch member are engaged with either the teeth 32 or 39. If the clutch member 33 were left in engagement with either the teeth 32 or 39 when the vehicle engine is being started, as soon as there is any rotation of the shaft 10 due to the crankshaft of the engine being turned, the clutch 17 would be engaged, and it would be difficult to continue to turn the crankshaft to start the engine since such engagement of the clutch 17 would complete a power train through the transmission. With the use of the manual control means for the clutch member 33, the clutch member may be moved out of engagement with the teeth 32 or 39 to open the low speed or reverse power trains through the transmission, and the vehicle engine may be started with the transmission in neutral and with no load on the engine.

With the use of my improved transmission control mechanism, power such as from the pump 14 may be used to actuate the positive clutches including the clutch member 33 and teeth 32 and 39, the friction clutch 17, and the brake 42. These parts may thus be quite large in size whereby the transmission is capable of transmitting large torques for driving heavy vehicles; however, the clutches and brakes for completing the forward and reverse power trains through the transmission may nevertheless be easily controlled.

I do not intend to limit the invention to the details shown and described, except only insofar as certain of the appended claims are specifically so limited, as it will be apparent that modifications may be made without departing from the principles of the invention.

I claim:

1. In a transmission, the combination of input and output shafts, a power train between said shafts, a clutch in said power train, a second clutch in said power train, a control mechanically connected with said first-named clutch for engaging the clutch, power operated means for actuating said second clutch, a power operated power control connected with and adapted to move the first-named control, a source of power connected with said power operated means and said power operated power control, said power operated power control being disposed operatively between said power source and said power operated means for engaging said second clutch when said first clutch is engaged and disengaging said second clutch when said first clutch is disengaged.

2. In a transmission, the combination of input and output shafts, a power train between said shafts, a positive type clutch in said power train, a friction clutch in said power train, a control mechanically connected with said first-named clutch for engaging the clutch, fluid pressure operated means for engaging said friction clutch, a source of fluid pressure, and a valve operated by fluid pressure and connected with and adapted to move said control for operatively connecting said fluid pressure source and said fluid pressure operated means for engaging said friction clutch when said positive type clutch is engaged.

3. In a transmission, the combination of input and output shafts, a power train between said shafts, a hydrodynamic coupling device in said power train and having a driven element, a clutch in said power train, a power-operated brake for retarding rotation of the driven element of said coupling device, a control for engaging said clutch, a source of power connected with said brake, and a power control connected to move with said first-named control and operatively disposed between said power source and said brake for disengaging the brake when said clutch is engaged and for engaging the brake when the clutch is disengaged.

4. In a transmission, the combination of input and output shafts, a power train between said shafts, a hydrodynamic coupling device in said power train and having a driven element, a positive-type clutch in said power train between said coupling device and said output shaft, a power-operated brake for retarding rotation of the driven element of said coupling device, a control for engaging said clutch, a source of power connected with said brake, and a power control connected to move with said first-named control and operatively disposed between said power source and said brake for disengaging the brake when said clutch is engaged and engaging the brake when the clutch is disengaged.

5. In a transmission, the combination of input and output shafts, a power train between said shafts, a hydrodynamic coupling device in said power train and having a driven element, a positive-type clutch in said power train between said device and said output shaft, a control mechanically connected with said clutch for engaging the clutch, a fluid pressure operated brake for retarding rotation of the driven element of said hydrodynamic device, a source of fluid pressure connected with said brake, and a valve connected to move with said control and operatively disposed between said fluid pressure source and said brake for disengaging the brake when the clutch is engaged.

6. In a transmission, the combination of input and output shafts, a power train between said shafts, a hydrodynamic coupling device in said power train and having a driven element, a clutch in said power train for connecting said device and said input shaft, a clutch in said power train between said device and said output shaft, a brake for the driven element of said hydrodynamic device, and a control for said clutches and brake, said control in one position engaging both of said clutches and disengaging said brake and in another position disengaging both of said clutches and engaging said brake.

7. In a transmission, the combination of input and output shafts, a power train between said shafts, a hydrodynamic device in said power train and having a driven element, a power-operated clutch in said power train for connecting said device and said input shaft, a clutch in said power train between said device and said output shaft, a power-operated brake for the driven element of said device, a control mechanically connected with said second-named clutch, a source of power connected with said first-named clutch and said brake, and a power control connected to move with said first-named control and operatively disposed between said power source and both said brake and first-named clutch, said controls in one position thereof functioning to disengage said clutches and to engage said brake and in another position thereof functioning to disengage said brake and to engage said clutches.

8. In a transmission, the combination of input and output shafts, a power train between said shafts, a hydrodynamic coupling device in said power train and having a driven element, a fluid pressure engaged clutch for connecting said input shaft and coupling device, a positive-type clutch in said power train between said device and said output shaft, a fluid pressure engaged brake for the driven element of said coupling device, a control mechanically connected with said last-named clutch for engaging the clutch, a source of fluid under pressure connected with said brake and said first-named clutch, and a valve disposed operatively between said power source and both said brake and said first-named clutch and connected to move with said control, said control in one position thereof engaging said second-named clutch and by means of said valve connecting said power source and said first-named clutch and disconnecting the power source and said brake, said control in another position thereof disengaging said positive-type clutch and by means of said valve connecting said power source and said brake and disconnecting the power source and said first-named clutch.

9. In a transmission, the combination of input and output shafts, a power train between said shafts, a clutch in said power train, a second clutch in said power train, a control mechanically connected with said first-named clutch for engaging the clutch, power-operated means for actuating said second clutch, a source of power connected with said power-operated means, a power control connected to move with said first-named control and disposed operatively between said power source and said power-operated means for engaging said second clutch when said first clutch is engaged and disengaging said second clutch when said first clutch is disengaged, said power source also being connected with said controls for actuating the controls, and another control operatively disposed between said first and second named controls and said power source whereby the two first-named controls may be moved between their clutch-engaging and disengaging positions.

10. In a transmission, the combination of input and output shafts, a power train between said shafts, a positive type clutch in said power train, a friction clutch in said power train, a control mechanically connected with said first-named clutch for engaging the clutch, fluid pressure operated means for engaging said friction clutch, a source of fluid pressure, and a valve connected to move with said control for operatively connecting said fluid pressure source and said fluid pressure operated means for engaging said friction clutch when said positive type clutch is engaged, said fluid pressure source also being connected with said valve for actuating the valve, and another valve operatively disposed between said first-named valve and said fluid pressure source whereby fluid pressure may be applied to said first-named valve to move it and said control between their clutch-engaging and disengaging positions.

11. In a transmission, the combination of input and output shafts, a power train between said shafts, a hydrodynamic coupling device in said power train and having a driven element, a clutch in said power train, a power-operated brake for retarding rotation of the driven element of said coupling device, a control for actuating said clutch, a source of power connected with said brake, a power control connected to move with said first-named control and operatively disposed between said power source and said brake for disengaging the brake when said clutch is engaged and for engaging the brake when the clutch is disengaged, said power source also being connected with said controls for moving the controls, and another power control operatively disposed between said first-named controls and said power source whereby power may be applied to said first-named controls to move them between their clutch-engaging and disengaging positions.

12. In a transmission, the combination of input and output shafts, a power train between said shafts, a hydrodynamic coupling device in said power train and having a driven element, a positive type clutch in said power train between said device and said output shaft, a control mechanically connected with said clutch for actuating the clutch, a fluid pressure operated brake for retarding rotation of the driven element of said hydrodynamic device, a source of fluid pressure connected with said brake, a valve connected to move with said control and operatively disposed between said fluid pressure source and said brake for disengaging the brake when the clutch is engaged, said fluid pressure source also being connected with said valve for moving the valve and control between their clutch-engaging and disengaging positions, and another valve operatively disposed between said first-named valve and said fluid pressure source and a control member connecting the two valves, the arrangement being such that said first-named valve and the control connected therewith are moved distances corresponding to the distances said control member is moved.

13. In a transmission, the combination of input and output shafts, a power train between said shafts, a hydrodynamic coupling device in said power train and having a driven element, a power-operated clutch in said power train for connecting said device and said input shaft, a clutch in said power train between said device and said output shaft, a power-operated brake for the driven element of said device, a control mechanically connected with said second-named clutch, a source of power connected with said first-named clutch and said brake, a power control movable with said first-named control and operatively disposed between said power source and both said brake and first-named clutch, said controls in one position thereof functioning to disengage said clutches and to engage said brake and in another position thereof functioning to disengage said brake and to engage said clutches, said power source also being connected with said controls for moving the controls, and a power control operatively disposed between said first-named controls and said power source whereby the first-named controls may be moved between their clutch-engaging and disengaging positions.

14. In a transmission, the combination of input and output shafts, a power train between said shafts, a hydrodynamic coupling device in said power train and having a driven element, a fluid pressure engaged friction clutch for connecting said input shaft and coupling device, a positive type clutch in said power train between said device and said output shaft, a fluid pressure engaged brake for the driven element of said coupling device, a control mechanically connected with said last-named clutch for engaging the clutch, a source of fluid under pressure connected with said brake and said first-named clutch, a valve operatively disposed between said fluid pressure source and both said brake and said first-named clutch and movable with said control, said control in one position thereof engaging said positive type clutch and by means of said valve connecting said fluid pressure source and said first-named clutch and disconnecting the fluid pressure source and said brake, said control in another position thereof disengaging said positive type clutch and by means of said valve connecting said fluid pressure source and said brake and disconnecting the fluid pressure source and said first-named clutch, said fluid pressure source also being connected with said valve for moving the valve, and another valve operatively disposed between said first-named valve and said fluid pressure source and a control member interconnecting said two valves, the arrangement being such that said first-named valve and said control are moved distances corresponding to the distances said control member is moved.

15. In a variable speed power transmitting device, a plurality of engageable elements for effecting changes in speed ratio in the device, fluid means for operating said elements and means for controlling the fluid means, said last mentioned means comprising a piston for controlling at least one of said elements and a manually operable follow-up valve for controlling the position of said piston, said piston also serving as a valve to control the remaining elements.

16. In a variable speed power transmitting device, a plurality of engageable elements for effecting changes in speed ratio in the device, a piston mechanically connected with at least one of said elements for operating it, a manually operable follow-up valve for controlling the position of said piston, and fluid means for operating the remaining elements, said piston also serving as a valve to control the remaining elements.

17. In a variable speed power transmitting device, a plurality of engageable elements for effecting changes in speed ratio in the device and including a positive type clutch and a friction clutch, a piston mechanically connected with the positive type clutch for operating it and fluid means for operating the remaining elements including the friction clutch, and a manually operable follow-up valve for controlling the position of said piston, said piston also serving as a valve to control said remaining elements.

18. In a variable speed power transmitting device, an engageable element for effecting a change in speed ratio in the device, a fluid operated member connected with said element for positioning it, a mechanically operated member connected with said element for positioning it, a source of fluid under pressure, valve means controlling said fluid under pressure and thereby controlling the position of said fluid operated member, and a manual control connected with and adapted to move said mechanically operated member and said valve means to cause movement of said engageable element, the connection between the manual control and said mechanically operated member providing lost motion, whereby shifting of the manual control may move the valve means without directly moving the mechanically operated member.

19. In a variable speed power transmitting device, a clutch for effecting a change in speed ratio in the device, a fluid operated piston connected with said clutch for positioning it, a mechanically operated member connected with said clutch for positioning it, a source of fluid under pressure, a valve controlling said fluid under pressure and thereby controlling the position of said fluid operated piston, and a manual control connected with and adapted to move said mechanically operated member and said valve to cause movement of said clutch, the connection between the manual control and said mechanically operated member providing lost motion, whereby shifting of the manual control may move the valve without directly moving the mechanically operated member.

20. In a variable speed power transmitting device, a plurality of engageable elements for effecting changes in speed ratio in the device, a fluid operated member connected with at least one of said elements for positioning it, a mechanically operated member connected with said one element for positioning it, a source of fluid under pressure connected with said fluid operated member and said other engageable elements, valve means between said source of pressure and said fluid operated member for controlling the position of that member, and a manual control connected with and adapted to move said mechanically operated member and said valve means to cause movement of said one engageable element, the connection between the manual control and said mechanically operated member providing a lost motion whereby shifting of the manual control may move the valve means without directly moving the mechanically operated member, said fluid operated member also serving as a valve to control the remaining engageable elements.

21. In a variable speed power transmitting device which includes a hydrodynamic coupling device having a driven element, a plurality of engageable elements for effecting changes in speed ratio in the power transmitting device and including a positive type clutch, a fluid pressure engaged friction clutch and a fluid pressure engaged brake for the driven element of the coupling device, a fluid operated piston connected with said positive type clutch for positioning it, a mechanically operated member connected with said positive type clutch for positioning it, a source of fluid under pressure connected with said brake and said friction clutch, said fluid operated piston also serving as a valve to control the supply of fluid pressure to said friction clutch and said brake, other valve means controlling the fluid under pressure and thereby controlling the position of said fluid operated piston, a manual control connected with and adapted to move said mechanically operated member and said last-mentioned valve means to cause movement of said positive type clutch, the connection between the manual control and said mechanically operated member providing lost motion, whereby shifting of the manual control may move the valve without directly moving the mechanically operated member.

B. BYRON LE MAY, Jr.

REFERENCES CITED

The following references are of record in the file of this patent:

UNITED STATES PATENTS

| Number | Name | Date |
|---|---|---|
| 1,746,765 | Carhart | Feb. 11, 1930 |
| 1,960,705 | Kochling | May 29, 1940 |
| 2,012,084 | Hollscher et al. | Aug. 20, 1935 |
| 2,157,592 | Casler | May 9, 1939 |
| 2,189,680 | Sanford | Feb. 6, 1940 |
| 2,230,133 | Clarke | Jan. 28, 1941 |
| 2,263,047 | Newton | Nov. 18, 1941 |
| 2,271,919 | Jandasek | Feb. 3, 1942 |
| 2,392,520 | Benz et al. | Jan. 8, 1946 |